(12) United States Patent
Ding et al.

(10) Patent No.: US 8,370,035 B2
(45) Date of Patent: Feb. 5, 2013

(54) GEAR CONTROL SYSTEM AND METHOD

(75) Inventors: Xianggen Ding, Shenzhen (CN); Bo Zu, Shenzhen (CN); Xuguang Zhou, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 623 days.

(21) Appl. No.: 12/623,766

(22) Filed: Nov. 23, 2009

(65) Prior Publication Data

US 2010/0131162 A1 May 27, 2010

(30) Foreign Application Priority Data

Nov. 26, 2008 (CN) .......................... 2008 1 0178429

(51) Int. Cl.
*G06F 7/00* (2006.01)
(52) U.S. Cl. ............. 701/58; 701/62; 180/443; 318/653
(58) Field of Classification Search .................... 701/51, 701/58, 62; 318/685, 653; 180/443
See application file for complete search history.

(56) References Cited

U.S. PATENT DOCUMENTS

| 6,870,335 B2 | 3/2005 | Lindstrom et al. | |
| 7,161,314 B2 | 1/2007 | Nakai et al. | |
| 2009/0183940 A1* | 7/2009 | Sekine et al. | 180/443 |

FOREIGN PATENT DOCUMENTS

| CN | 2759832 | 2/2006 |
| JP | 5064482 | 3/1993 |
| JP | 2002323127 | 11/2002 |

OTHER PUBLICATIONS

International Search Report dated Jan. 29, 2010 issued in related PCT Application No. PCT/CN2009/075024.

* cited by examiner

*Primary Examiner* — Gertrude Arthur Jeanglaude
(74) *Attorney, Agent, or Firm* — Brinks Hofer Gilson & Lione

(57) ABSTRACT

A gear control system includes a pulse modulating circuit, a motor, and a central processing unit operatively coupled to the pulse modulating circuit and configured to control rotation of the motor from an original gear position to a desired gear position via the pulse modulating circuit. A motor position detecting device is operatively coupled to the central processing unit and detects the motor rotation position and transmits the motor position information corresponding to the motor rotation position to the central processing unit. The central processing unit determines whether the motor has reached the desired gear position based on the motor position information, and actuates the pulse modulating circuit to transmit pulses to actuate the motor to reach the desired gear position when the motor has not reached the desired gear position.

9 Claims, 4 Drawing Sheets

GEAR CONTROL SYSTEM AND METHOD

CROSS-REFERENCE TO RELATED APPLICATIONS

This application claims priority to and benefit of Chinese Patent Application Serial No. 200810178429.4, filed on Nov. 26, 2008.

BACKGROUND

1. Field of the Invention

The present invention relates to a gear control system and method.

2. Related Art

Gear control systems are used for actuating the switched reluctance motor to lock or unlock the gear-box when the electric vehicle is parking. The working principle of the switched reluctance motor is the same as the reactive step motor. The switched reluctance motor is given a special pulses to rotate the rotor to the desired gear position, meaning that the rotor is rotated to a predetermined angular orientation. The load of locking and unlocking gear-box is mutative when the electric vehicle is in different situations. The electric power changes when the electric load of the vehicle changes. When the load is changed, the switched reluctance motor may break step. In order to eliminate the undesirable influence of breaking step, the gear control system must control the motor so that the rotor can be turned to the desired gear position.

SUMMARY

The present invention provides an improved gear control system and method in electric vehicle which ensures that the motor rotor is rotated to the desired gear position when the motor breaks step.

According to an embodiment of the present invention, the gear control system includes a pulse modulating circuit, a motor and a central processing unit which is connected to the pulse modulating circuit and controls rotation of the motor from the original gear to the desired gear position via the pulse modulating circuit. The control system also includes a motor position detecting device which is connected to the central processing unit and is used for detecting the motor rotation position, and sends the information of the motor rotation position to the central processing unit.

The central processing unit is further used for judging whether the motor reaches the desired gear position according to the information of the motor rotation position and actuates the pulse modulating circuit to resend a pulse to actuate the motor to reach the desired gear position when the motor did not reach the desired gear position.

According to another embodiment of the present invention, the method for controlling the gear includes controlling rotation of the motor from the original gear position to the desired gear position using pulse modulation by detecting the rotation position of the motor, judging whether the motor reaches the desired gear position according to the information of the rotation position of the motor, transmitting pulses to actuate the motor to reach the desired gear position when the motor did not reach the desired gear position.

The gear control system and method controls the motor in a closed loop manner via the motor position detecting device and detects the rotation position of motor after the motor stops rotating to determine whether the motor had reached the desired gear position. If the motor has not reached the desired gear position, the gear control system resends pulses to actuate the motor to rotate to the desired gear position. Thus, the gear control system and method according to one embodiment can actuate the motor to rotate precisely to the desired gear position.

BRIEF DESCRIPTION OF THE DRAWINGS

The aforementioned features and advantages of the invention as well as additional features and advantages thereof will be more clearly understood hereinafter as a result of a detailed description of embodiments when taken in conjunction with the drawings.

DETAILED DESCRIPTION

Figure 1:
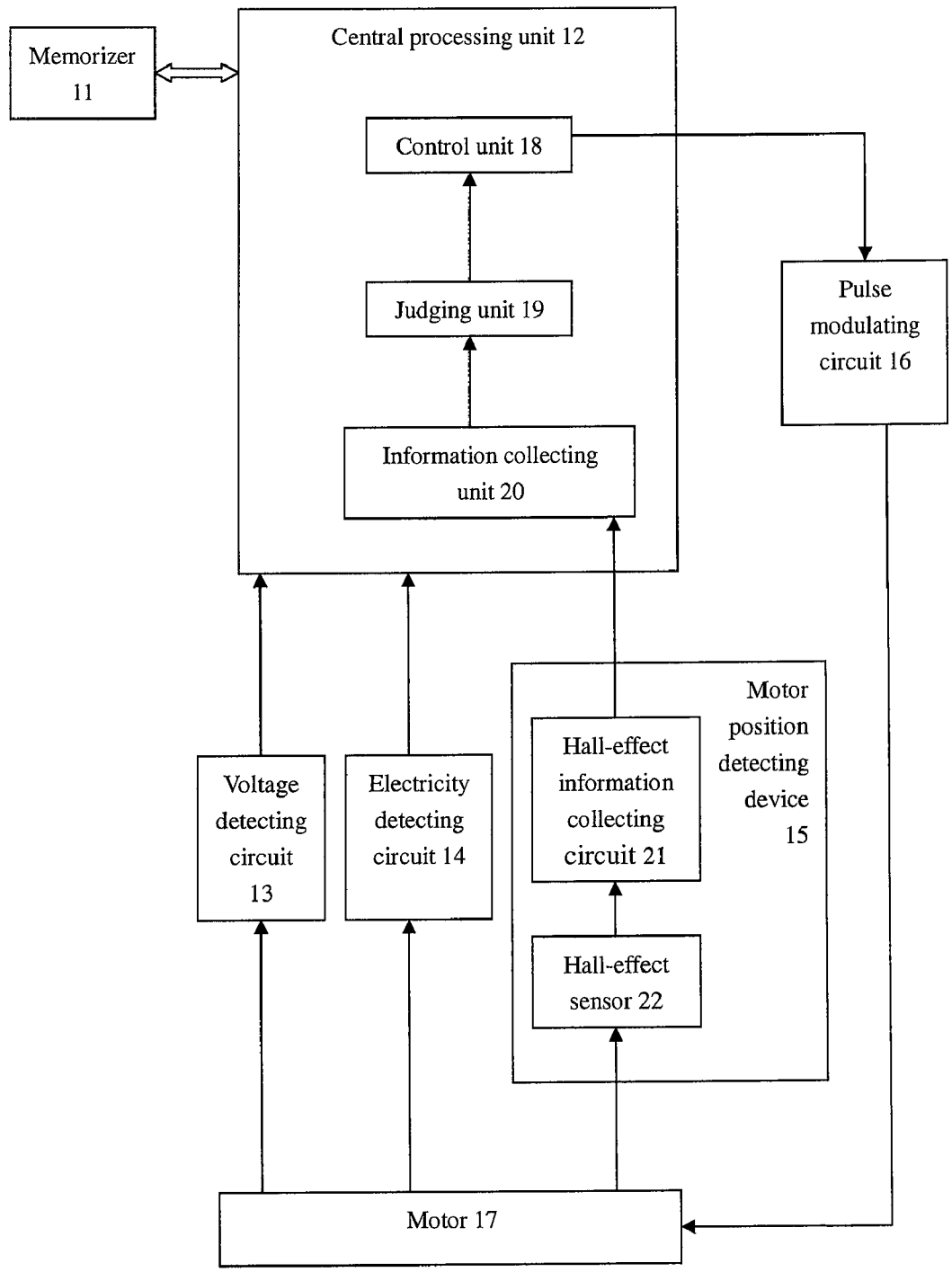
FIG. 1 is a block diagram of the gear control system.

As shown in FIG. 1, the gear control system includes a pulse modulating circuit 16, a motor 17, and a central processing unit 12, which is connected to the pulse modulating circuit 16 and controls rotation of the motor 17 from the original gear position to the desired gear position via the pulse modulating circuit 16. The control system also includes a motor position detecting device 15 which is connected to the central processing unit 12 and is used for detecting the motor rotation position and sending the information of the motor rotation position to the central processing unit 12. The central processing unit 12 determines whether the rotor of the motor 17 reaches the desired gear position according to the information of the motor rotation position and controls the pulse modulating circuit 16 to resend a pulse to actuate the motor 17 to reach the desired gear position when the motor 17 has not reached the desired gear position.

According to one embodiment of the present invention, the motor position detecting device 15 includes a Hall-effect sensor 22 and a Hall-effect information collecting circuit 21. The Hall-effect sensor 22 is connected to the Hall-effect information collecting circuit 21. The Hall-effect information collecting circuit 21 is connected to the central processing unit 12. The Hall-effect sensor is 22 used for generating Hall-effect information by inducing rotation movement of the motor rotor and sending Hall-effect information to the Hall-effect information collecting circuit 21. The Hall-effect information collecting circuit 21 is used for collecting the Hall-effect information and sending the Hall-effect information to the central processing unit 12.

Figure 3:
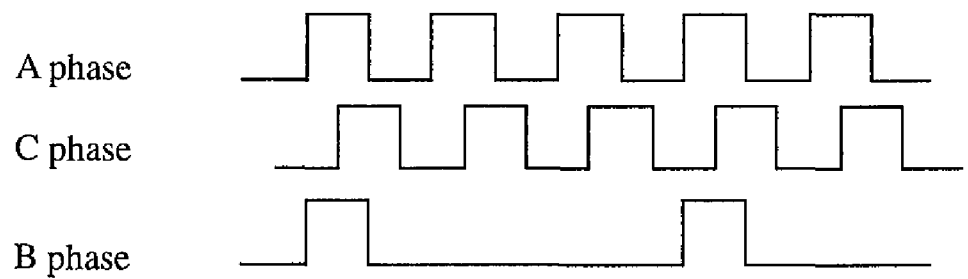
FIG. 3(1) and FIG. 3(2) are timing diagrams illustrating Hall-effect information of the motor position detecting device.
Figure 3:
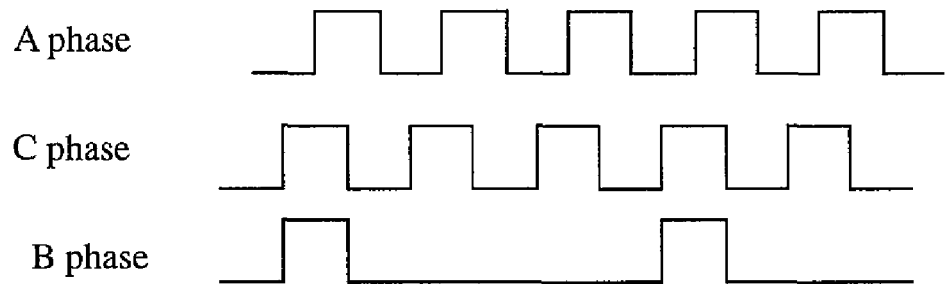

According to an embodiment of the present invention, the Hall-effect sensor 22 in the motor position detecting device 15 includes three Hall-effect CMOS chips, which are used for detecting rotation of the motor 17. Each of the three Hall-effect sensors generate a group of Hall-effect information, which is collected by the Hall-effect information collecting circuit 21. FIG. 3(1) and FIG. 3(2) illustrate the Hall-effect timing information of the motor position detecting device 15. The Hall-effect sensors in the motor position detecting device 15 generate three groups of Hall-effect information, namely "A-phase" Hall-effect information, "B-phase" Hall-effect information and "C-phase" Hall-effect information. The rotation direction of the motor 17 can be judged by comparing the phase relation of the A-phase Hall-effect information, the B-phase Hall-effect information and the C-phase Hall-effect information. The three Hall-effect CMOS chips are positioned in the motor 17, under the information ring which is connected to the rotor, and fixed to the back-end cover.

Figure 4A:
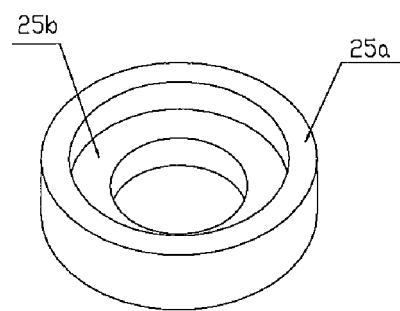
FIGS. 4a and 4b show the motor information ring.
Figure 4B:
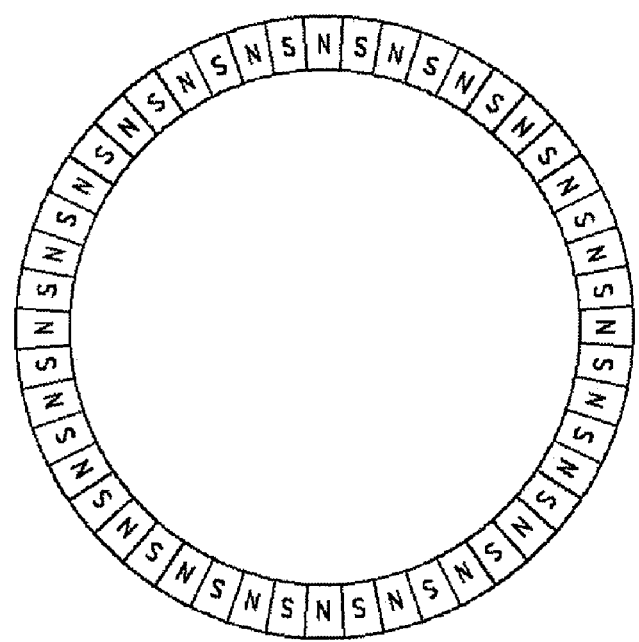

FIGS. 4*a* and 4*b* illustrate the information ring. The two Hall-effect CMOS chips which generate the A-phase Hall-effect information and C-phase Hall-effect information are located in the same circle whose center is the axis of the rotor. The circle and an outer-circle 25*a* of the information ring 25 have the same radius. As shown in FIG. 4(1), there are N magnetic poles distributed about the outer-circle 25*a* of the information ring. FIG. 4(2) shows the arrangement of the magnetic poles on the outer-circle 25*a* of the information ring. The Hall-effect CMOS chips, which generate the A-phase Hall-effect information and the C-phase Hall-effect information generate Hall-effect information based on the magnetic field of the magnetic poles.

The interval between adjacent magnetic poles is 360/N degree where N is the number of poles. Thus, the interval between the Hall-effect CMOS chips of the A-phase Hall-effect information and the C-phase Hall-effect information is $\theta$, where $360/N<\theta<360-360/N$, and preferably $2<N<100$. According to one embodiment, N is 48. The Hall-effect CMOS chips which generate the B-phase Hall-effect information is positioned about another circle whose center is the axis of the rotor. The diameter of the circle corresponding to the Hall-effect CMOS chips generating the B-phase Hall-effect information is smaller than that of the circle corresponding to the Hall-effect CMOS chips generating A-phase and C-phase Hall-effect information, and is the same as that of the inner-circle 25*b* of the information ring. The Hall-effect CMOS chip of the B-phase Hall-effect information is in any point of the inner-circle 25*b* of the information ring.

FIG. 3(1) shows the phase relationship of the A-phase Hall-effect information, the B-phase Hall-effect information, and the C-phase Hall-effect information when the motor rotates towards the locking direction. FIG. 3(2) shows the phase relationship of the A-phase Hall-effect information, B-phase Hall-effect information, and C-phase Hall-effect information when the motor rotates towards the unlocking direction.

FIGS. 3(1) and 3(2) show how to obtain the number of the breaking steps of the motor according to an embodiment of the present invention. When the motor 17 rotates at a steady speed and the A-phase Hall-effect information is before the C-phase Hall-effect information, the motor 17 rotates towards the locking direction. When the motor 17 rotates at a steady speed and the C-phase Hall-effect information is before the A-phase Hall-effect information, the motor 17 rotates towards the unlocking direction. The phase difference between the A-phase Hall-effect information and the C-phase Hall-effect information is a predetermined value, for example about 15 degrees.

If the phase difference between the A-phase Hall-effect information and the C-phase Hall-effect information is not at the predetermined value, the motor 17 breaks step. When the phase difference between the A-phase Hall-effect information and the C-phase Hall-effect information exceeds the predetermined value by a certain amount, for example, the phase difference between the A-phase Hall-effect information and the C-phase Hall-effect information is less than $\frac{1}{3}$ of the pulse cycle or more than $\frac{1}{2}$ of the pulse cycle, it can be determined that the motor breaks step and adds one to the amount of breaking steps. When the motor 17 stops rotating, the amount of breaking steps is known. The B-phase Hall-effect information functions as a reference standard of the phase relationship and replaces the A-phase Hall-effect information or the B-phase Hall-effect information when there is a malfunction.

The central processing unit 12 sends a group of actuating pulses to the pulse modulating circuit 16. The pulse modulating circuit 16 modulates the width of the actuating pulses to change the duty cycle. Thus, the torque of the motor 17 is modulated and the motor 17 is actuated to rotate to the different desired gear position by sending pulses of different duty cycles.

The central processing unit 12 includes an information collecting unit 20, a judging unit 19 and a control unit 18. The information collecting unit 20 is connected to the judging unit 19 and the motor position detecting device 15. The judging unit is 19 connected to the control unit 18. The control unit 18 is connected to the pulse modulating circuit 16. The information collecting unit 20 collects the information from the motor rotation position from the motor position detecting device 15. The judging unit 19 receives the information of the motor rotation position from the information collecting unit 20 to determine whether the motor 17 reaches the desired gear position. The control unit 18 is used for controlling the rotation of the rotor of the motor 17 from the original gear position to the desired gear position via the pulse modulating circuit 16. The control unit 18 actuates the pulse modulating circuit 16 to resend a pulse when the motor 17 has not reached the desired gear position.

The central processing unit 12 also obtains the number of the breaking steps of the motor according to the information of the motor rotation position and determines the number of the pulses needed to resend according to the number of the breaking steps, when the motor 17 has not reach the desired gear position. Thus, the central processing unit 12 does not need to count the number of the pulses, and decrease the operation time of the gear control system.

The central processing unit 12 is also used for judging whether the motor 17 has stopped rotating. If the motor 17 stops rotating, it is then determined whether the motor 17 has reached the desired gear position. According to an embodiment of the present invention, the system determines whether the motor 17 has stopped rotating by using the Hall-effect information. When the Hall-effect information is unavailable for a predetermined amount of time, the system assumes that the motor 17 has stopped rotating.

The gear control system can detect when the motor 17, the pulse modulating circuit 16 and the motor position detecting device 15 are not functioning correctly to avoid a malfunction and ensure the safety of the electric vehicle. According to an embodiment, the gear control system further includes a voltage detecting circuit 13, which is connected to the central processing unit 12, and an electricity detecting circuit 14, which is connected to the central processing unit 12. The voltage detecting circuit 13 detects the working voltage of the motor 17 and transmits the voltage information to the central processing unit 12. The electricity detecting circuit 14 detects the working electricity of the motor 17 and transmits the electricity information to the central processing unit 12. The central processing unit 12 further collects the voltage information and the electricity information, and determines whether the motor 17, the pulse modulating circuit 16, and the motor position detecting device 15 are properly functioning in accordance with the voltage information and the electricity information. When the aforementioned components are not properly working, the motor stops.

The gear control system further includes a memorizer 11 or other form of information storage component. The memorizer 11 is connected to the central processing unit 12. The central processing unit 12 obtains the original gear position information from the memorizer 11 and stores the desired gear position information into the memorizer 11 after the motor reaches the desired gear position. According to one embodiment, the desired gear position information stored in the memorizer 11 is the same as the original gear position information in the next operation. Because of the memorizer 11, the gear control system can obtain the original gear position information directly from the memorizer 11. This increases the response time of the gear control system.

Figure 2:
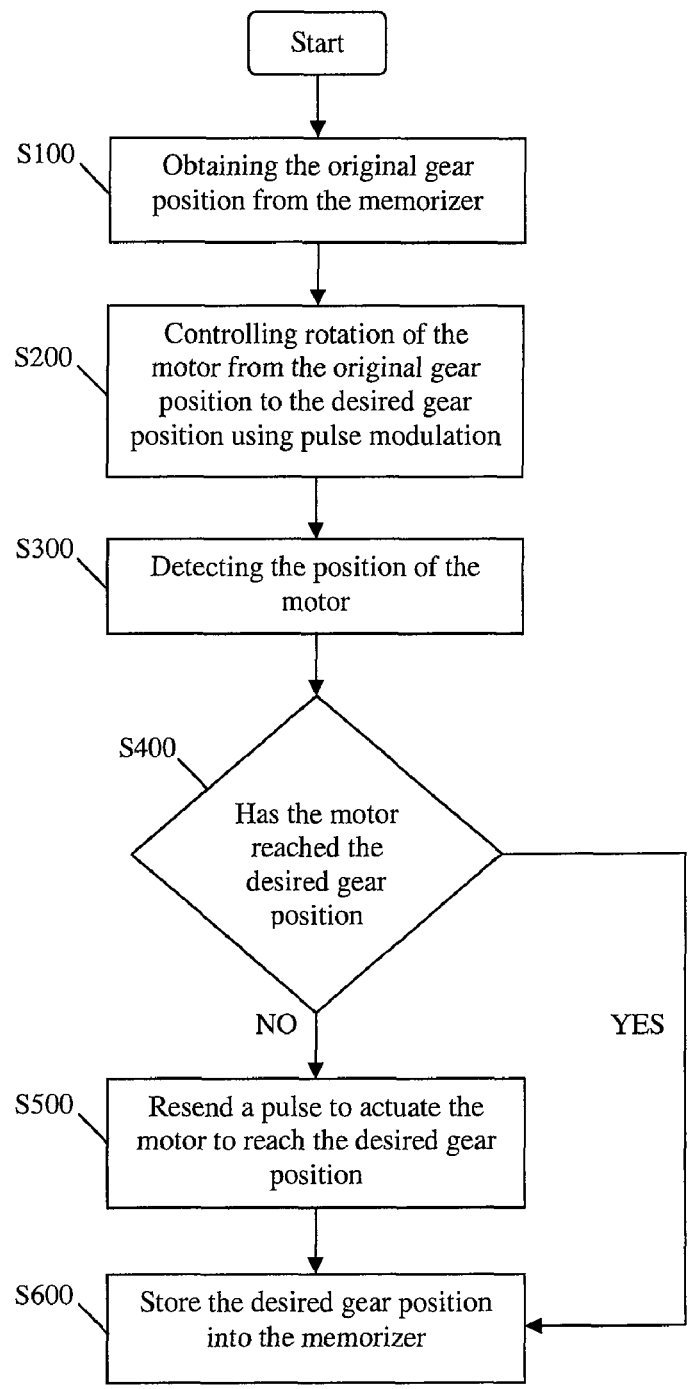
FIG. 2 is a flow chart illustrating the gear control method.

FIG. 2 is a flow chart illustrating the process of the gear control method. As shown in FIG. 2, the gear control method includes controlling the rotation of the rotor of the motor from the original gear position to the desired gear position in using pulse modulation. The method further includes detecting the rotation position of the motor, determining whether the motor 17 reaches the desired gear position according to the information corresponding to the rotational position of the motor, and resending a pulse (or one or more pulses) to actuate the motor 17 to reach the desired gear position if the motor 17 did not reach the desired gear position.

The step S100 obtains the original gear position information from the memorizer 11. According to one embodiment, the original gear position information is the same as the desired gear position information, which was stored in the memorizer 11.

The step S200 controls the rotation of the motor 17 from the original gear position to the desired gear position using pulse modulation. Thus, the torque of the motor 17 is modulated and the motor 17 is controlled to rotate to the desired gear position by sending pulses of different duty cycles.

The step 300 shows detecting the rotor position of the motor. According to one embodiment of the present invention, the step 300 obtains the rotational position of the motor 17, and generates and collects the Hall-effect information.

The step S400 determines whether the motor reaches the desired gear position according to the information corresponding to the motor position. If the motor reaches the desired gear position, the routine branches to step S600. If the motor has not reached the desired gear position, the routine executes step S500 to determine whether the motor 17 has reached the desired gear position when the motor stops rotating. According to one embodiment, it is to judge whether the motor 17 stops rotating via the Hall-effect information. When the Hall-effect information is unavailable for a predetermined period of time, the system assumes that the motor 17 has stopped rotating.

In step S500, pulses are resent to actuate the motor to reach the desired gear position if the motor did not previously reach the desired gear position. According to one embodiment, the system determines the number of the breaking steps of the motor according to the information of the motor rotation position, and determines the number of the additional pulses needed to resend according to the amount of the breaking steps when the motor had not reached the desired gear position.

In step S600, the system stores the desired gear position information in the memorizer 11 when the motor 17 reaches the desired gear position. According to one embodiment, the desired gear position information is stored in the memorizer 11 as the original gear position information for the next operation.

The gear control method further includes detecting the working voltage of the motor via the voltage detecting circuit 13 and detects the working electricity of the motor via the electricity detecting circuit 14, and transmits the voltage detecting information and the electricity detecting information, determines whether the pulse modulating circuit 16, the motor 17, and motor position detecting device 15 are functioning properly in accordance with the voltage detecting information and the electricity detecting information, and stops the motor 17 when the system is not functioning properly. According to another embodiment, this step is performed after obtaining the original gear position information from the memorizer 11 via the central processing unit 12.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A gear control system, comprising:
   a pulse modulating circuit;
   a motor;
   a central processing unit operatively coupled to the pulse modulating circuit and configured to control rotation of the motor from an original gear position to a desired gear position via the pulse modulating circuit;
   a motor position detecting device operatively coupled to the central processing unit and configured to detect a motor rotation position and transmit motor position information corresponding to the motor rotation position to the central processing unit;
   the motor position detecting device further including:
     a Hall-effect sensor;
     a Hall information collecting circuit operatively coupled to the Hall-effect sensor and to the central processing unit;
     wherein the Hall information collecting circuit is configured to generate Hall information by inducing the rotational position of the motor and transmitting Hall information to the Hall information collecting circuit; and
     wherein the Hall information collecting circuit is configured to collect the Hall information and transmit the Hall information to the central processing unit to permit the central processing unit to determine the rotation position of the motor using the Hall information;
   the central processing unit configured to determine whether the motor has reached the desired gear position based on the motor position information;
   the central processing unit configured to actuate the pulse modulating circuit to transmit pulses to actuate the motor to reach the desired gear position when the motor has not reached the desired gear position.

2. The gear control system according to claim 1, wherein the central processing unit determines the number of breaking steps of the motor according to the information of the motor rotation position and determines the number of the pulses according to the number of the breaking steps when the motor has not reached the desired gear position.

3. The gear control system according to claim 1, wherein the central processing unit determines whether the motor has reached the desired gear position after the motor stops rotating.

4. The gear control system according to claim 1, wherein the control system further comprising:
   a memorizer operatively coupled to the central processing unit; wherein
   the central processing unit obtains original gear position information of the motor from the memorizer and stores the desired gear position information into the memorizer when the motor reaches the desired gear position.

5. A gear control system, comprising:
   a pulse modulating circuit;

a motor;

a central processing unit operatively coupled to the pulse modulating circuit and configured to control rotation of the motor from an original gear position to a desired sear position via the pulse modulating circuit;

a motor position detecting device operatively coupled to the central processing unit and configured to detect a motor rotation position and transmit motor position information corresponding to the motor rotation position to the central processing unit;

the central processing unit configure to determine whether the motor has reached the desired gear position based on the motor position information;

the central processing unit configured to actuate the pulse modulating circuit to transmit pulses to actuate the motor to reach the desired gear position when the motor has not reached the desired gear position; and the central processing unit further including:
- an information collecting unit;
- a judging unit;
- a control unit; wherein
  - the information collecting unit is operatively coupled to the judging unit and to the motor position detecting device;
  - the judging unit is operatively coupled to the control unit;
  - the control unit is operatively coupled to the pulse modulating circuit;
  - the information collecting unit collects information of the motor rotation position from the motor position detecting device;
  - the judging unit receives the information of the motor rotation position from the information collecting unit and determines whether the motor has reached the desired gear position;
  - the control unit controls the rotation of the motor from the original gear position to the desired gear position via the pulse modulating circuit; and
  - the control unit actuates the pulse modulating circuit to transmit one or more pulses when the motor has not reach the desired gear position.

6. A method for controlling rotation of a motor from an original gear position to a desired gear position, comprising:
- detecting a rotational position of the motor;
- determining whether the motor has reached the desired gear position according to rotational position information corresponding to the motor;
- transmitting one or more pulses to actuate the motor to reach the desired gear position when the motor has not reached the desired gear position; and
- wherein the step of determining the rotational position of the motor further includes:
  - detecting the rotation position of the motor and generating Hall information: and
  - collecting the 1-lall information and determining the rotation position on of the motor according the Hall information.

7. The method according to claim 6, further comprising:
- determining a count of a number of breaking steps of the motor based in the rotational position of the motor; and
- determining a count of a number of pulses needed transmit based on the number of breaking steps when the motor has not reached the desired gear position.

8. The method according to claim 6, further comprising determining whether the motor has reached the desired gear position based on the rotational position of the motor, after the motor has stopped rotating.

9. The method according to claim 6, further comprising:
- obtaining the original gear position from a memorizer circuit; and
- storing the desired gear position into the memorizer circuit when the motor has reached the desired gear position.

* * * * *